United States Patent [19]

Seki et al.

[11] Patent Number: 5,371,691
[45] Date of Patent: Dec. 6, 1994

[54] DEVICE FOR CORRECTING CHARACTERISTIC ERRORS OF A CAMERA

[75] Inventors: Yoichi Seki; Tomihiko Aoyama; Michio Kawai; Hiroyuki Saito; Kanji Ito; Mitsuhiro Kakuta, all of Yotsukaido, Japan

[73] Assignee: Seikosha Co., Ltd., Japan

[21] Appl. No.: 712,118

[22] Filed: Jun. 7, 1991

[30] Foreign Application Priority Data

Jun. 12, 1990 [JP] Japan ................... 2-153098

[51] Int. Cl.⁵ .............................. G03B 7/091
[52] U.S. Cl. ..................... 364/571.04; 364/525; 354/416
[58] Field of Search ............. 364/525, 571.04, 571.07; 354/412, 416, 400, 202; 348/187, 103, 135, 348, 164

[56] References Cited

U.S. PATENT DOCUMENTS

| Re. 34,140 | 12/1992 | Nakajima | 354/412 |
|---|---|---|---|
| 4,316,257 | 2/1982 | Del Medico et al. | 364/571.04 |
| 4,345,825 | 8/1982 | Matteson et al. | 354/412 |
| 4,423,934 | 1/1984 | Lambeth et al. | 354/412 |
| 4,534,059 | 8/1985 | Yamada | 364/571.07 |
| 4,541,695 | 9/1985 | Wainwright et al. | 364/525 |
| 4,614,974 | 9/1986 | Toyama | 348/348 |
| 4,621,292 | 11/1986 | Hirao et al. | 348/348 |
| 4,903,055 | 2/1990 | Lourette et al. | 354/354 |
| 4,924,253 | 5/1990 | Imai et al. | 354/400 |
| 4,959,726 | 9/1990 | Miida et al. | 348/348 |
| 4,977,521 | 12/1990 | Kaplan | 364/571.07 |
| 5,003,400 | 3/1991 | Murakami et al. | 348/348 |
| 5,033,015 | 7/1991 | Zwirn | 348/187 |
| 5,101,271 | 3/1992 | Andrews et al. | 348/164 |
| 5,134,431 | 7/1992 | Ishimura et al. | 354/416 |
| 5,150,957 | 9/1992 | Walker et al. | 348/103 |
| 5,157,435 | 10/1992 | Min et al. | 348/348 |
| 5,181,098 | 1/1993 | Guerin et al. | 348/187 |
| 5,192,964 | 3/1993 | Shinohara et al. | 354/202 |
| 5,198,850 | 3/1993 | Saegua | 354/412 |
| 5,283,640 | 2/1994 | Tilton | 348/135 |

Primary Examiner—Ellis B. Ramirez
Attorney, Agent, or Firm—Bruce L. Adams; Van C. Wilks

[57] ABSTRACT

A photographic camera has a rectilinear approximate operation circuit for calculating characteristic correction data for correcting errors in the operational characteristics of the camera. Predetermined theoretical characteristic data dependent on operational characteristics of the camera are stored. Measured data corresponding to predetermined measured values are stored as individually measured characteristic data in a nonvolatile EEPROM so that the stored measured data can be easily changed by rewriting the EEPROM. An object signal is generated depending on an object to be photographed. The rectilinear approximate operational circuit calculates characteristic correction data from the object signal, the theoretical characteristic data and the measured characteristic data, which is then used for correcting errors in the operation characteristics of the camera.

13 Claims, 7 Drawing Sheets

FIG. 4

| distance L (m) | design distance code Xij |
|---|---|
| ∞ | 96 |
| 76.8 | 97 |
| ⋮ | ⋮ |
| 0.985 | 174 |
| 0.972 | 175 |
| 0.96 | 176 |
| ⋮ | ⋮ |
| 0.486 | 254 |
| 0.483 | 255 |

FIG. 5

| exposure quantity Ev | design exposure code Xij |
|---|---|
| 20 | 0 |
| 19.9375 | 1 |
| 19.875 | 2 |
| ⋮ | ⋮ |
| 13.0625 | 111 |
| 13 | 112 |
| 12.9375 | 113 |
| ⋮ | ⋮ |
| 4.125 | 254 |
| 4.0625 | 255 |

DEVICE FOR CORRECTING CHARACTERISTIC ERRORS OF A CAMERA

BACKGROUND OF THE INVENTION

The present invention pertains to a device for correcting a characteristic error of a camera. More particularly, the present invention pertains to a camera characteristic errors correcting device capable of correcting an error of specific data expressible by rectangular coordinate axes.

A camera is typically provided with photometric/range-finding ICs and motor drive ICs used for auto-diaphragming, lens driving and film feeding. Accommodated in a camera box body is an electrical unit incorporating a program for executing a variety of photographing modes together with a CPU for controlling the ICs.

For attaining high multifunctions by means of a program AE and a program AF while improving the operability of the camera, the CPU is constructed of a 1-chip microcomputer incorporating analog input terminals, a ROM, a RAM and A/D converting circuits. The CPU performs additional functions such as monitoring battery capacity and voltage, synchro-flashing, adjustments of variations in inside and outside temperatures of the camera box body, as well as display control of a liquid crystal display unit, LEDs and so forth.

Adjustment of the camera before initial use does not typically require the preparation of multiple theoretical characteristic data according to the type of devices, lots, and delivery districts, provided some redundant data are added to the theoretical characteristic data. However, as automation of cameras advances and built-in programs and data increase (for example, lens characteristic, lens mounting positions and characteristics of a light-receiving element, light-emitting element and temperature sensor), adjustment before initial use can not be accomplished effectively using only one kind of data corresponding thereto. Problems occur because unifiable data are put in the high-order, while ununifiable data are hierachized. To achieve a commercial success, typically such a camera is arranged for dedicated use.

A great majority of cameras operate based on the theoretical characteristic data. An example is a distance detecting device disclosed in Japanese Patent Laid-Open Publication No. 198818/1988, in which an error coefficient for the theoretical characteristic data is measured at the time of delivery of the camera. This error coefficient is stored in the storage unit to correct the characteristic error.

However, the range-finding factors do not necessarily exhibit rectilinear characteristics due to the following items.

(1) Influence of electric noises:

If the subject being photographed exists at a remote position, variations in magnitudes of signals and noises are small because less amount of light is reflected therefrom.

(2) The reflected light is incident on a portion other than a normal position due to an influence of lens aberration or the like.

(3) The ratio deviates when the characteristics of the light-receiving sensor are not uniform.

(4) The incident position to a PSD deviates due to an influence of roughness on the mold surface of the light-receiving sensor.

(5) The incident position deviates on account of a curvature of a plastic cover for covering the front surface of the light projecting/receiving lens.

For these reasons, range-finding with a high accuracy cannot be expected, and applicability to a high grade high performance camera cannot be obtained.

In an electric adjusting device of a camera which is disclosed in Japanese Patent Laid-Open Publication No. 25733/1987, the data are not hierachized, and the programs are not subroutinized. Written to a nonvolatile memory (hereinafter referred to as an $E^2PROM$) is a measured error ($\Delta Tv$) for each of a series of camera units with respect to an exposure time Tv calculated from, e.g., an aperture value Av, a film sensitivity Sv and a brightness Bv without using the theoretical characteristic data. The characteristic error is corrected based on this measured error $\Delta Tv$.

This method, however, presents several drawbacks. A large capacity $E^2PROM$ is needed. In addition, the number of testing steps (including a write time of the $E^2PROM$) for measurement increases, and the costs of producing the camera is high.

SUMMARY OF THE INVENTION

It is an object of the present invention, which has been devised to obviate the drawbacks described above, to provide a camera characteristic errors correcting device capable of using a small capacity $E^2PROM$ by storing, in the $E^2PROM$, measured characteristic data corresponding to predetermined measuring points and theoretical characteristic data.

Another object of the present invention is to reduce the number of testing steps required before the initial use of the camera.

In accordance with the present invention, there is provided a device for correcting characteristic errors of a camera in accordance with characteristic data expressible by one coordinate axis of rectangular coordinate axes and the other coordinate axis, comprising: a measured characteristic data storage $E^2PROM$ for storing measured characteristic data corresponding to predetermined measuring points; and a measured/theoretical characteristic data errors correcting means for generating correction characteristic data from characteristic errors between the measured characteristic data stored in the measured characteristic data storage $E^2PROM$ and theoretical characteristic data.

In the camera characteristic errors correcting device of the invention, one coordinate axis of the rectangular coordinate axes indicates characteristic data dependent on distance. The measured characteristic data storage $E^2PROM$ for storing the measured characteristic data is defined as a range-finding characteristic data storage $E^2PROM$ for storing range-finding characteristic data corresponding to predetermined range-finding points. The measured/theoretical characteristic data errors correcting means is constructed of a measured/theoretical range-finding data errors correcting means.

In the camera characteristic errors correcting device of the invention, one coordinate axis of the rectangular coordinate axes indicates characteristic data on exposure quantity. The measured characteristic data storage $E^2PROM$ for storing the measured characteristic data is defined as an exposure quantity characteristic data storage $E^2PROM$ for storing exposure quantity characteristic data corresponding to predetermined exposure quantities. The measured/theoretical characteristic data errors correcting means is constructed of a measured/- theoretical exposure quantity data errors correcting means.

BRIEF DESCRIPTION OF THE DRAWINGS

FIG. 4 is a diagram illustrating a data configuration of the device for correcting characteristic errors of a camera in accordance with the present invention;

Fig. 5 is a diagram illustrating a data configuration of the device for correcting characteristic errors of a camera in accordance with the present invention;

DETAILED DESCRIPTION OF THE INVENTION

One embodiment of a device for correcting characteristic errors of a camera according to the present invention will hereinafter be described with reference to FIGS. 1-9.

Figure 1:
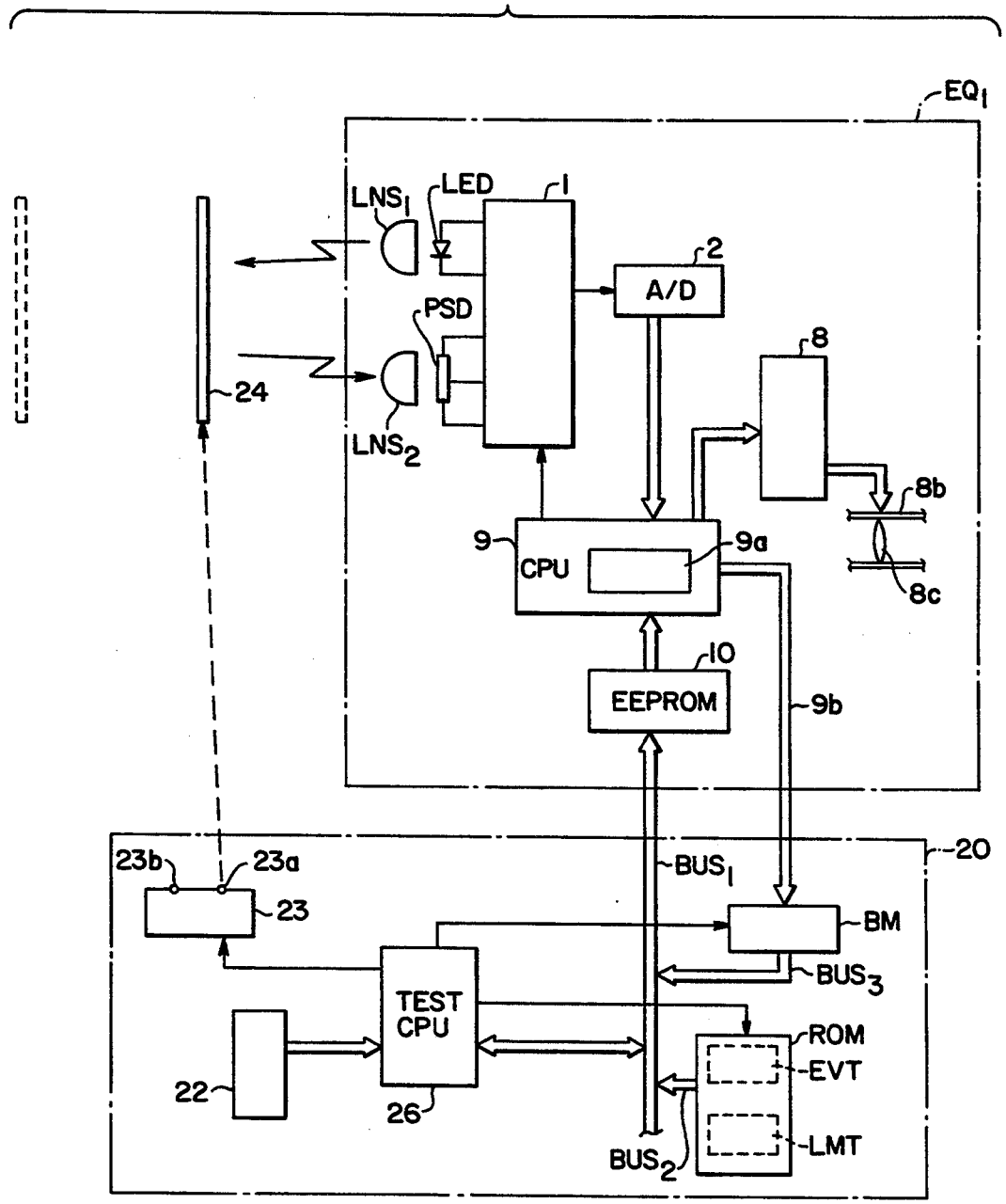
FIG. 1 is a block diagram showing a first embodiment of a device for correcting characteristic errors of a camera in accordance with the present invention.

Referring to FIG. 1, the symbol $EQ_1$ represents a range-finding module. The range-finding module $EQ_1$ is constructed of a range-finding circuit 1 provided with a projection lens $LNS_1$, a light-receiving lens $LNS_2$, a light-emitting element LED and a light-receiving element PSD; an A/D converting circuit 2; a driving circuit 8 to which a lens-barrel 8b and a lens 8c are connected; a CPU 9 incorporating a rectilinear approximate operation circuit 9a; and an $E^2PROM$ 10 for storing range-finding characteristic data. A distance code Yij measured at a distance sample point LPij which will be discussed later and a design distance code Xij are written via a write bus $BUS_1$ of a characteristic tester 20 to the $E^2PROM$ 10 for storing the range-finding characteristic data.

The characteristic tester 20 is composed of a buffer memory BM; a characteristic data storage table ROM including an exposure table EVT and a distance table LMT; a test data setting unit 22; a test output circuit 23 including a distance plate terminal 23a and a light source terminal 23b; and a test CPU 26. In operation, a test plate 24 is connected to the distance plate terminal 23a of the test output circuit 23, when the test data setting unit 22 sets the distance test data.

When the test data set by the test data setting unit 22 is defined as exposure test data, lamp 25b (shown in FIG. 2) of the test light source 25 connected to the light source terminal 23b of the test output circuit 23 is lit up with a light intensity corresponding to the set exposure test data.

Figure 3:
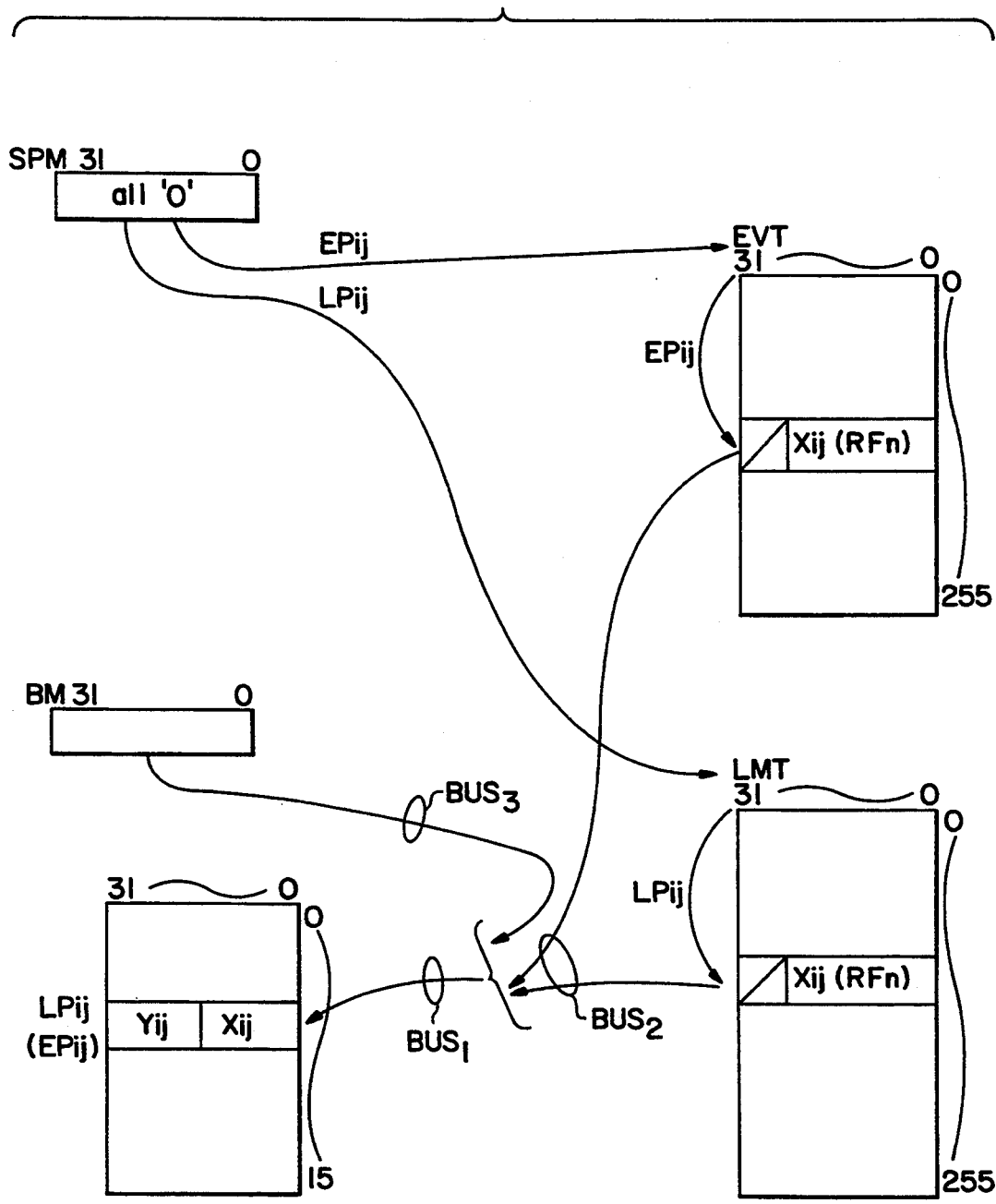
Fig. 3 is a diagram illustrating a data configuration of the device for correcting characteristic errors of a camera in accordance with the present invention.
Figure 6:
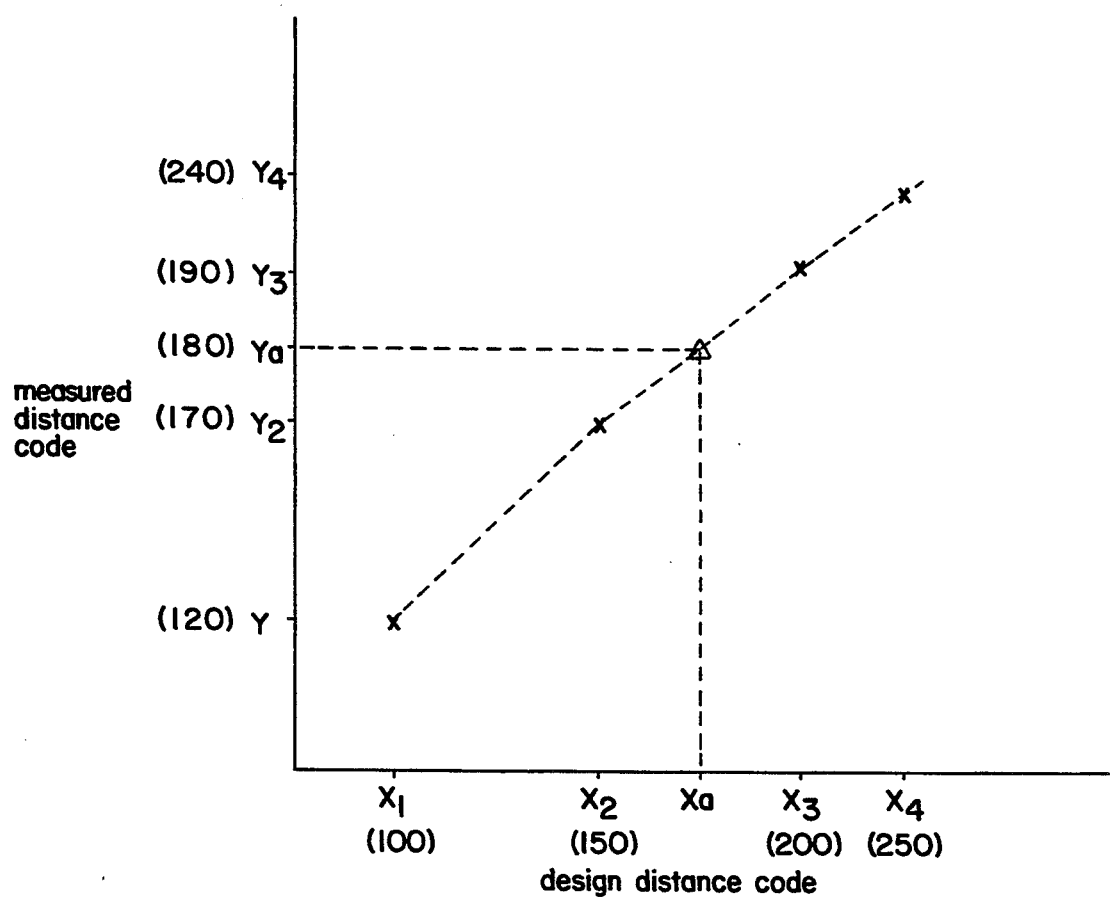
Fig. 6 is a characteristic diagram of the device for correcting characteristic errors of a camera in accordance with the present invention.
Figure 7:
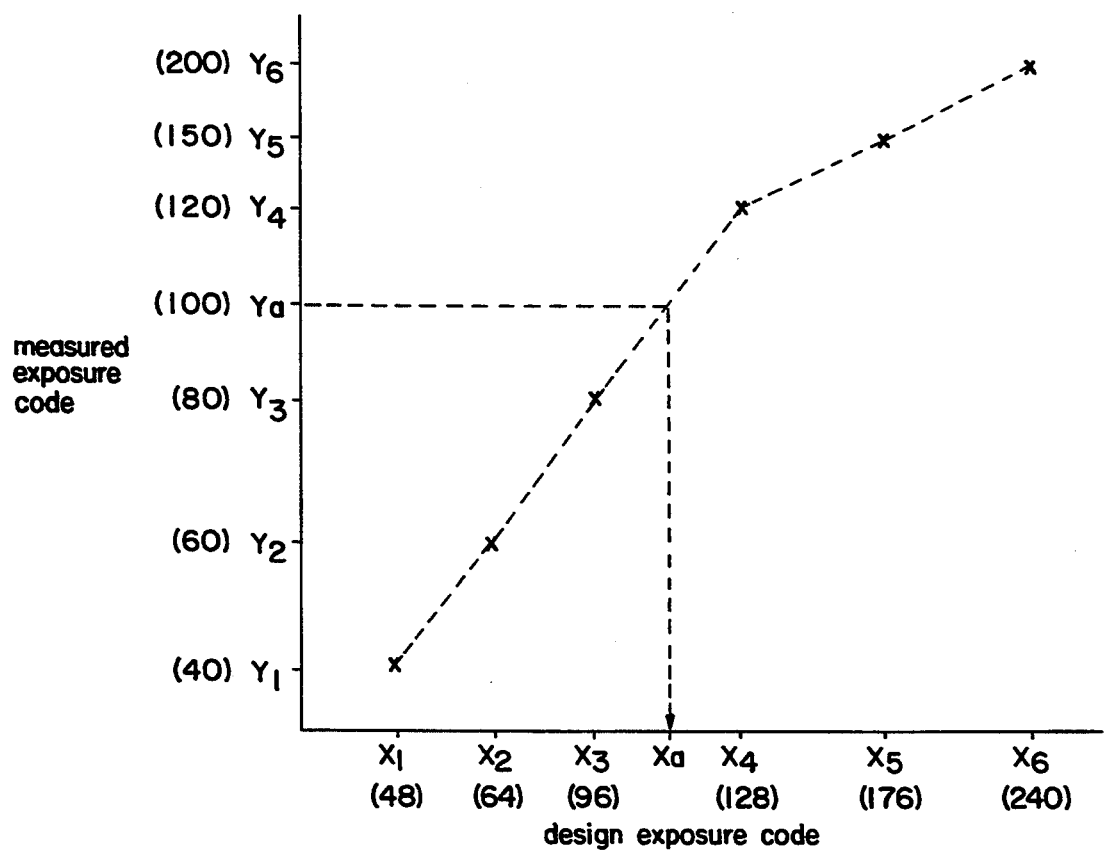
FIG. 7 is a characteristic diagram of the device for correcting characteristic errors of a camera in accordance with the present invention.

The characteristic data storage table ROM of the characteristic tester 20 provides, as illustrated in FIG. 3, an exposure table EVT composed of 0th to 255th words, wherein 1 word is composed of 32 bit, and a distance table LMT. Design exposure codes Xij and set distance codes Xij are stored therein, respectively. In the distance table LMT, when the distance test data is set by the test data setting unit 22, a predetermined bit position in a sample marker SPM is made active. A distance sample point LPij is then determined. After determining the distance sample point LPij, the distance table LMT is indexed. The design distance codes Xij or reference data Rfn are stored in addresses 0 through 15 of the range-finding characteristic data storage $E^2PROM$ 10 of the range-finding module $EQ_1$ in sequence from the proximal end of the distance sample point LPij to the distal end thereof via the ROM data bus $BUS_2$ and the write bus $BUS_1$.

The distance test data is set by the test data setting unit 22, and hence the test plate 24 of a distance specified at the distance sample point LPij operates. As a result, a distance to the test plate 24 is measured by the light-emitting element LED, the projection lens $LNS_1$, the test plate 24, the light-receiving lens $LNS_2$ and the light-receiving element PSD. This measured value is transmitted from the CPU 9 via the data bus 9b to the buffer memory BM. The measured distance code Yij inputted to the buffer memory BM is stored in the range-finding characteristic data storage $E_2PROM$ 10 through the sample bus $BUS_3$ and the write bus $BUS_1$.

Note that if a design value equivalent to a primary rectilinear line can be calculated from the design distance code Xij, the reference data RFn is stored in the characteristic data storage table ROM instead of the design distance code Xij. The proximal end of the design code Xij is 255, while the distal end thereof is 96. Set as data $Y_1$ is the measured distance code Yij corresponding to the distance sample point LPij in the address 0 of the range-finding characteristic data storage $E^2PROM$ 10. The distance codes Yij are set sequentially such as $Y_2, Y_3, Y_4 \ldots$ The design distance codes Xij are set as data $X_1, X_2 \ldots$ When the exposure test data is set by the test data setting unit 22, a predetermined bit position of the sample marker SPM is made active, and thereby the exposure sample point EPij is determined. Once the exposure sample point has been determined, the exposure table EVT is indexed by the exposure sample point EPij. The design exposure codes Xij or the reference data RFn are stored in sequence of the exposure sample points EPij (dark →bright) to the addresses 0 through 15 of the exposure characteristic data storage $E^2PROM$ 10 of a photometric module $EQ_2$ via the ROM data bus $BUS_2$ and the write bus $BUS_1$.

Furthermore, since the exposure test data has been set by the test data setting unit 22, a light intensity of the lamp 25b of the test light source 25 is selected by a test output circuit 23. The measured exposure code Yij is then stored in the buffer memory BM. This measured exposure code Yij is transmitted via the sample bus $BUS_3$ and the write bus $BUS_1$ to a characteristic data storage $E^2PROM$ 11. The exposure code Yij is stored together with the foregoing design exposure code Xij in the characteristic data storage $E^2PROM$ 11. In this case, the design exposure code Xij is defined as 0 when Ev is 20. The same code Xij is defined as 255 when Ev is 4 1/16. Note that if the design exposure data are incalculable from the design exposure codes Xij (e.g., when the data corresponding to gears of a mechanical module are required), the design exposure codes Xij are stored as the reference data RFn in the exposure table EVT.

In the range-finding module $EQ_1$, the rectilinear approximate operation circuit 9a of the CPU calculates distance codes Xa from the measured distance codes Yij (data $Y_1, Y_2 \ldots$) measured at the sample points LPij and the design distance codes Xij (data $X_1, X_2 \ldots$) in accordance with the formula (1).

$$Xa = Xn \frac{Xn + 1 - Xn}{Yn + 1 - Yn} (Ya - Yn) \quad (1)$$

where $Yn < Ya < Yn+1$.

In the case of the photometric module $EQ_2$, the rectilinear approximate operation circuit 9a calculates exposure codes Xa from the measured exposure codes Yij (data $Y_1, Y_2 \ldots$) and the design exposure codes Xij (data $X_1, X_2 \ldots$) in accordance with the formula (1).

Correction of a characteristic error of the range-finding module $Q_1$ by use of the thus constructed device for correcting characteristic error of a camera involves the following steps. The test plate 24 is operated by the test output circuit 23. Written sequentially to the 0-15 words of the range-finding characteristic data storage $E^2PROM$ depicted in FIG. 1 are $X_1, X_2, X_3, X_4$ corresponding to the distance sample points LPij (ij is assumed as 19.2, 1.4, 0.7, 0.5). These numeric values become 100, 150, 200, 250 each marked with x in FIG. 6. $Y_1, Y_2, Y_3, Y_4$ become 120, 170, 190, 240.

If the real range-finding code Ya is herein 180, it is assumed that Ya=180, Yn+1=190, Yn=170, Xn=150 and Xn+1=200. These values are substituted in the formula (1).

$$Xa = 150 + \frac{200 - 150}{190 - 170} (180 - 170) \quad (2)$$

Xa in the formula (2) is given such as Xa=175. L is obtained such as L=0.972m referring to a distance reference table LREF shown in FIG. 4 for Xa=175.

Figure 2:
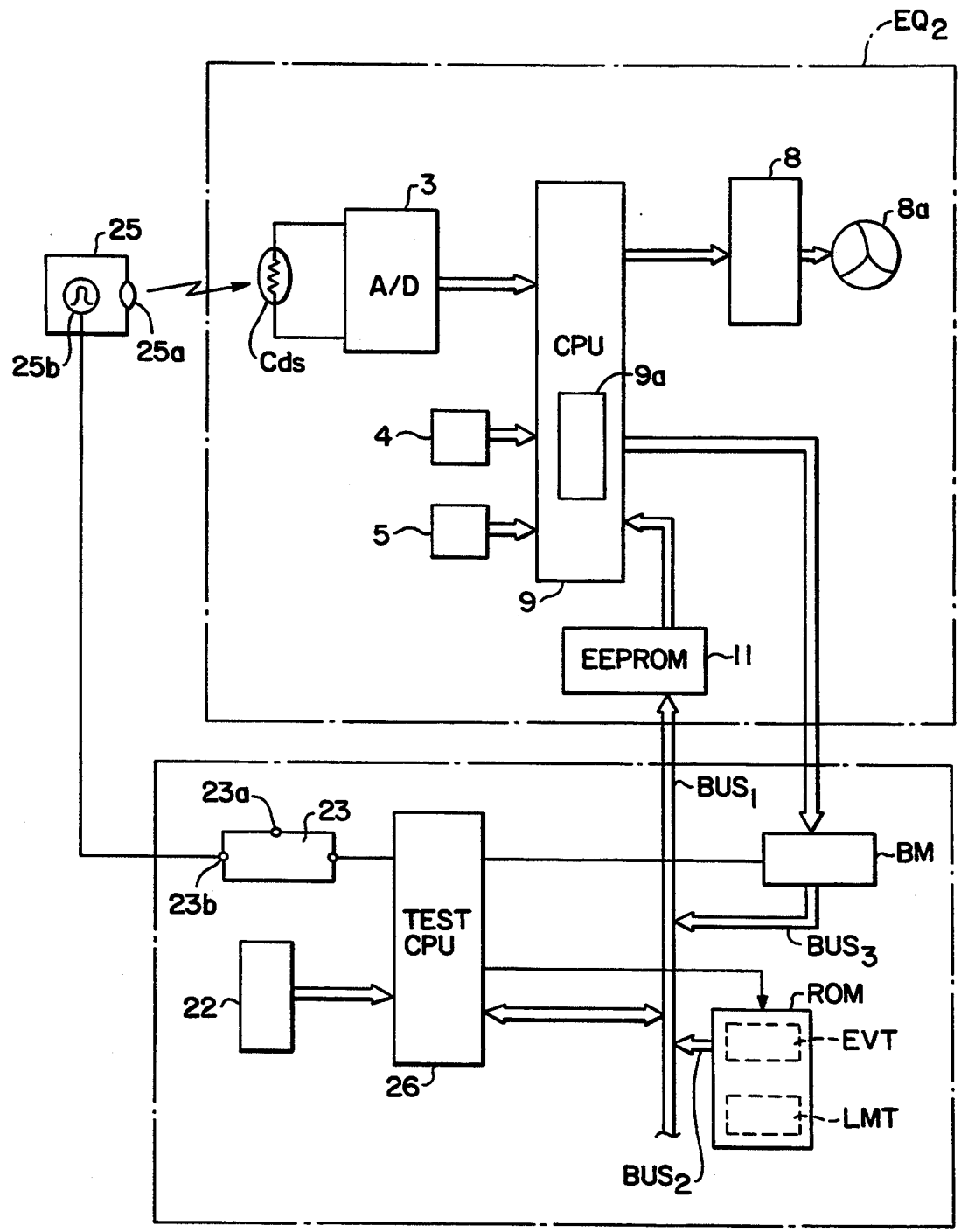
FIG. 2 is a block diagram showing a second embodiment of a device for correcting characteristic errors of a camera in accordance with the present invention.

Next, $X_1-X_6$ corresponding to the exposure sample points EPij (ij is assumed as Ev 17, 16, 14, 12, 9, 5) are written to the 0-15 words of the exposure characteristic data storage $E^2PROM$ 11 depicted in FIG. 2. These values become 48, 64, 96, 128, 176, 240 each marked with x in FIG. 7. $Y_1-Y_6$ become 40, 60, 80, 120, 150, 200.

If the real exposure code Ya is herein 100, it is assumed that Ya=100, Yn+1=120, Yn=80, Xn+1=128, and Xn=96. These values are substituted in the formula (1).

$$Xa = 96 + \frac{128 - 96}{120 - 80} (100 - 80) \quad (3)$$

Xa in the formula (3) is given such as Xa=112. Ev=13 (Ev) is obtained referring to an exposure quantity reference table EREF shown in FIG. 5 for Xa=112. Ev=13 (Ev) is obtained.

Figure 8:
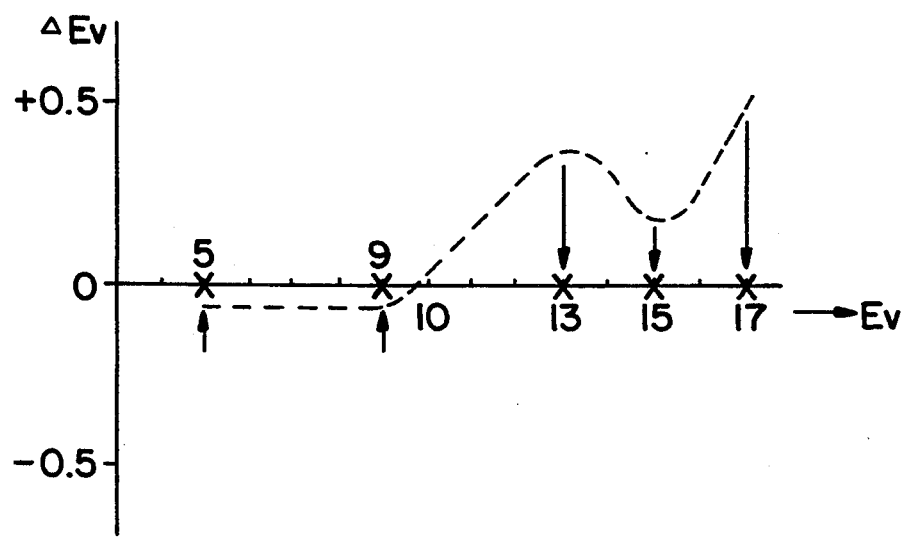
FIG. 8 is a characteristic diagram of the device for correcting characteristic errors of a camera in accordance with the present invention.
Figure 9:
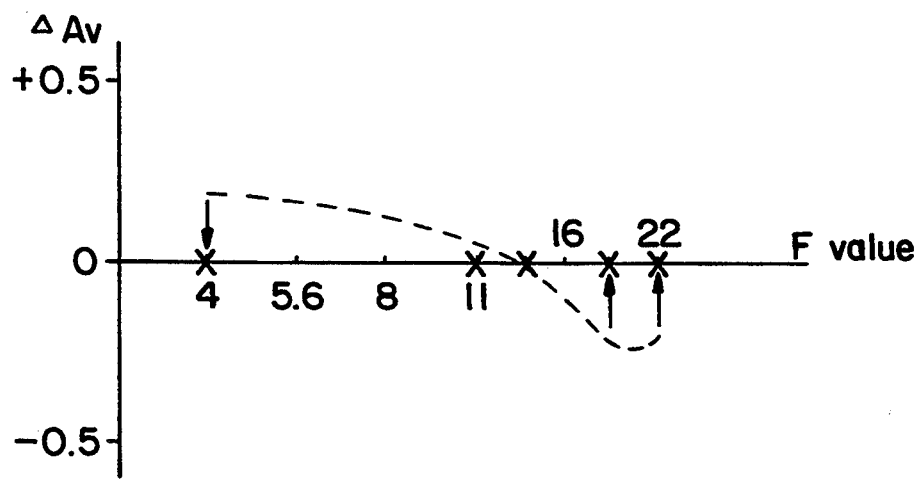
FIG. 9 is a characteristic diagram of the device for correcting characteristic errors of a camera in accordance with the present invention.

Next, FIG. 8 shows a correction of the Ev value calculated from an exposure quantity, a film sensitivity (ISO) and an F value. FIG. 9 shows a correction of strobe control. The dotted lines indicate conditions before effecting the corrections, while X-lines indicate conditions after the correction.

The corrections associated with a variety of characteristic errors in the embodiment discussed above are not limited to those described above. The method given above may be applied to, for instance, an optical system mechanism in which the light-receiving element PSD receives the light in central, right and left positions. This method is also applied to a correction of lens characteristics.

The foregoing method may be applied further to correction of a conversion error relative to electric and mechanical conversion systems.

The data of the characteristic data storage table ROM are not limited to the embodiment discussed above but may be configured according to the types of models and the correction characteristics as well.

The device for correcting the characteristic errors of the camera according to the present invention works to correct the characteristic errors of the camera in accordance with the characteristic data expressible by rectangular coordinate axes. This characteristic errors correcting device is composed of the measured characteristic data storage $E^2PROM$ for storing the measured characteristic data corresponding to the predetermined measuring points; and the measured/theoretical characteristic data errors correcting means for generating the correction characteristic data from the characteristic errors between the measured characteristic data stored in the measured characteristic data storage $E^2PROM$ and the theoretical characteristic data. Exhibited are such advantages that the $E^2PROM$ having a small capacity is therefore usable, and the number of testing steps for delivery can be reduced.

One of the rectangular coordinate axes indicates the characteristic data dependent on distance. The measured characteristic data storage $E^2PROM$ for storing the measured characteristic data is defined as a range-finding characteristic data storage $E^2PROM$ for storing the range-finding characteristic data corresponding to the predetermined range-finding points. The measured/theoretical characteristic data errors correcting means is conceived as a measured/theoretical range-finding data errors correcting means. In this case, the range-finding errors can be corrected without using the range-finding errors correcting ROM.

The other rectangular coordinate axes indicates the characteristic data dependent on the exposure quantity. The measured characteristic data storage $E^2PROM$ for storing the measured characteristic data is defined as an exposure quantity characteristic data storage EPROM for storing the exposure quantity characteristic data corresponding to the predetermined exposure quantity. Moreover, the measured/theoretical characteristic data error correcting means is conceived as a measured/theoretical exposure quantity data errors correcting means. In this case, the photometric errors can be corrected without using a photometric errors correcting ROM.

We claim:

1. A photographic camera, comprising: range finding means including light emitting means for emitting an infrared beam to an object to be photographed, light receiving means for receiving the infrared beam reflected from the object and producing an output signal in response thereto, distance signal generating means for generating an analog signal representative of a distance from the object dependent on the output signal from the light receiving means, and an A/D converter for converting the analog signal to a digital value; first memory means comprising an EEPROM for storing theoretical characteristic data; second memory means comprising an EEPROM for storing measured data, each measured data corresponding to a predetermined distance and being stored as individually measured characteristic data; and a rectilinear approximate operation circuit for calculating characteristic correction data from the digital value, the theoretical characteristic data stored in the first memory and the measured characteristic data stored in the second memory, wherein the characteristic correction value is calculated using the equation $$Xa = Xn + \frac{Xn + 1 - Xn}{Yn + 1 - Yn} (Ya - Yn)$$

where
Yn≦Ya<Yn+1,
Xa=the calculated characteristic correction data,
Ya=the digital value,
Xn=the theoretical characteristic data, and
Yn=the measured characteristic data.

2. A photographic camera, comprising: photometric means including light receiving means for receiving light from an object to be photographed, object brightness signal generating means for generating a brightness signal dependent on an output from the light receiving means, and an A/D converter for converting the brightness signal to a digital value; first memory means comprising an EEPROM for storing theoretical characteristic data determined according to predetermined optical characteristics and device characteristics of the camera; second memory means comprising an EEPROM for storing measured data, each measured data corresponding to a predetermined distance and being stored as individually measured characteristic data; and a rectilinear approximate operation circuit for calculating characteristic correction data from the digital value, the theoretical characteristic data stored in the first memory and the measured characteristic data stored in the second memory, wherein the characteristic correction value is calculated using the equation $$Xa = Xn + \frac{Xn + 1 - Xn}{Yn + 1 - Yn} (Ya - Yn)$$

where
Yn≦Ya<Yn+1,
Xa=the calculated characteristic correction data,
Ya=the digital value,
Xn=the theoretical characteristic data, and
Yn=the measured characteristic data.

3. A photographic camera, comprising: object signal generating means for generating an object signal corresponding to a photographic characteristic of an object to be photographed; means for converting the object signal into a digital value; first memory means for storing predetermined theoretical characteristic data dependent on operational characteristics of the photographic camera; second memory means for storing measured data, each measured data corresponding to a predetermined measured value and being stored as individually measured characteristic data; and a rectilinear approximate operation circuit for calculating characteristic correction data from the object signal, the theoretical characteristic data stored in the first memory and the measured characteristic data stored in the second memory, the characteristic correction data being used for correcting errors in the operational characteristic of the photographic camera, the rectilinear approximate operation circuit having means for calculating the characteristic correction value using the equation $$Xa = Xn + \frac{Xn + 1 - Xn}{Yn + 1 - Yn} (Ya - Yn)$$

where
Yn≦Ya<Yn+1,
Xa=the calculated characteristic correction data,
Ya=the digital value,
Xn=the theoretical characteristic data, and
Yn=the measured characteristic data.

4. A photographic camera, comprising: object signal generating means for generating an object signal corresponding to a photographic characteristic of an object to be photographed, the object signal generating means comprises range finding means including light emitting means for emitting a light beam toward an object to be photographed, light receiving means for receiving the light beam reflected from the object and producing an output signal in response thereto, distance signal generating means for generating an analog signal representative of a distance from the object dependent on the output signal from the light receiving means, and an A/D converter for converting the analog signal to a digital value which constitutes the object signal; first memory means for storing theoretical characteristic data determined according to predetermined theoretical range-finding characteristics of the photographic camera; second memory means for storing measured data corresponding to measured range-finding characteristics of the photographic camera at respective distances, each measured data corresponding to a predetermined measured value and being stored as individually measured characteristic data; and a rectilinear approximate operation circuit for calculating characteristic correction data from the object signal, the theoretical characteristic data stored in the first memory and the measured characteristic data stored in the second memory, the characteristic correction data being used for correcting errors in the operational characteristic of the photographic camera.

5. A photographic camera according to claim 4; wherein the rectilinear approximate operation circuit has means for calculating the characteristic correction value for correcting range-finding characteristic error of the photographic camera using the equation $$Xa = Xn + \frac{Xn + 1 - Xn}{Yn + 1 - Yn} (Ya - Yn)$$

where
Yn≦Ya<Yn+1,
Xa=the calculated characteristic correction data,
Ya=the digital value,
Xn=the theoretical characteristic data, and
Yn=the measured characteristic data.

6. A photographic camera according to claim 5; wherein the first memory means comprises a read-only memory.

7. A photographic camera according to claim 5; wherein at least one of the first and the second memory means comprises an EEPROM.

8. A photographic camera, comprising: object signal generating means for generating an object signal corresponding to a photographic characteristic of an object to be photographed, the object signal generating means comprises photometric means including light receiving means for receiving light from an object to be photographed, object brightness signal generating means for generating a brightness signal dependent on an output from the light receiving means, and an A/D converter for converting the brightness signal to a digital value which constitutes the object signal; first memory means for storing theoretical characteristic data determined according to predetermined theoretical photometric characteristics of the photographic camera; second memory means for storing measured data corresponding to measured photometric characteristics of the photographic camera, each measured data corresponding to a predetermined measured value and being stored as individually measured characteristic data; and a rectilinear approximate operation circuit for calculating characteristic correction data from the object signal, the theoretical characteristic data stored in the first memory and the measured characteristic data stored in the second memory, the characteristic correction data being used for correcting errors in the operational characteristic of the photographic camera.

9. A photographic camera according to claim 8; wherein the rectilinear approximate operation circuit has means for calculating the characteristic correction value for correcting photometric characteristic error of the photographic camera using the equation $$Xa = Xn + \frac{Xn + 1 - Xn}{Yn + 1 - Yn} (Ya - Yn)$$

where
$Yn \leq Ya < Yn+1$,
$Xa$ = the calculated characteristic correction data,
$Ya$ = the digital value,
$Xn$ = the theoretical characteristic data, and
$Yn$ = the measured characteristic data.

10. A photographic camera according to claim 9; wherein the first memory means comprises a read-only memory.

11. A photographic camera according to claim 9; wherein at least one of the first and the second memory means comprises an EEPROM.

12. A photographic camera, comprising: object signal generating means for generating an object signal corresponding to a photographic characteristic of an object to be photographed; first memory means comprising a read-only memory for storing predetermined theoretical characteristic data dependent on operational characteristics of the photographic camera; second memory means for storing measured data, each measured data corresponding to a predetermined measured value and being stored as individually measured characteristic data; and a rectilinear approximate operation circuit for calculating characteristic correction data from the object signal, the theoretical characteristic data stored in the first memory and the measured characteristic data stored in the second memory, the characteristic correction data being used for correcting errors in the operational characteristic of the photographic camera.

13. A photographic camera, comprising: object signal generating means for generating an object signal corresponding to a photographic characteristic of an object to be photographed; first memory means for storing predetermined theoretical characteristic data dependent on operational characteristics of the photographic camera; second memory means for storing measured data, each measured data corresponding to a predetermined measured value and being stored as individually measured characteristic data; and a rectilinear approximate operation circuit for calculating characteristic correction data from the object signal, the theoretical characteristic data stored in the first memory and the measured characteristic data stored in the second memory, the characteristic correction data being used for correcting errors in the operational characteristic of the photographic camera; wherein at least one of the first and the second memory means comprises an EEPROM.

* * * * *